(12) United States Patent
Fleischer et al.

(10) Patent No.: US 9,582,466 B2
(45) Date of Patent: *Feb. 28, 2017

(54) VECTOR REGISTER FILE

(75) Inventors: Bruce M. Fleischer, Bedford Hills, NY (US); Thomas W. Fox, Hopewell Junction, NY (US); Hans M. Jacobson, White Plains, NY (US); Ravi Nair, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 993 days.

This patent is subject to a terminal disclaimer.

(21) Appl. No.: 13/572,886

(22) Filed: Aug. 13, 2012

(65) Prior Publication Data

US 2014/0047211 A1 Feb. 13, 2014

Related U.S. Application Data

(63) Continuation of application No. 13/570,372, filed on Aug. 9, 2012.

(51) Int. Cl.
*G06F 15/80* (2006.01)
*G06F 9/30* (2006.01)
*G06F 9/34* (2006.01)

(52) U.S. Cl.
CPC ...... *G06F 15/8076* (2013.01); *G06F 9/30098* (2013.01); *G06F 9/30109* (2013.01); *G06F 9/34* (2013.01)

(58) Field of Classification Search
CPC .... G06F 15/8076; G06F 9/34; G06F 15/8061; G06F 15/09; G06F 15/30098; G06F 9/30109

See application file for complete search history.

(56) References Cited

U.S. PATENT DOCUMENTS

| 3,287,703 A | 11/1966 | Slotnick |
| 4,980,817 A * | 12/1990 | Fossum et al. ............. 712/4 |
| 5,063,497 A | 11/1991 | Cutler et al. |

(Continued)

OTHER PUBLICATIONS

"Cell Architecture Explained Version 2," retrieved from http://www.blachford.info/computer/Cell/Cell0_v2.html on Jul. 23, 2012; pp. 1-3.

(Continued)

*Primary Examiner* — Benjamin Geib
(74) *Attorney, Agent, or Firm* — Cantor Colburn LLP (57) ABSTRACT

An aspect includes accessing a vector register in a vector register file. The vector register file includes a plurality of vector registers and each vector register includes a plurality of elements. A read command is received at a read port of the vector register file. The read command specifies a vector register address. The vector register address is decoded by an address decoder to determine a selected vector register of the vector register file. An element address is determined for one of the plurality of elements associated with the selected vector register based on a read element counter of the selected vector register. A word is selected in a memory array of the selected vector register as read data based on the element address. The read data is output from the selected vector register based on the decoding of the vector register address by the address decoder.

17 Claims, 7 Drawing Sheets

(56) References Cited

U.S. PATENT DOCUMENTS

| | | | |
|---|---|---|---|
| 5,115,393 A * | 5/1992 | Kashiyama et al. | G06F 15/8084 708/520 |
| 5,163,139 A | 11/1992 | Haigh et al. | |
| 5,437,043 A | 7/1995 | Fujii et al. | |
| 5,544,337 A * | 8/1996 | Beard et al. | 712/4 |
| 5,568,380 A | 10/1996 | Brodnax et al. | |
| 5,784,706 A | 7/1998 | Oberlin et al. | |
| 5,832,290 A | 11/1998 | Gostin et al. | |
| 5,903,769 A | 5/1999 | Arya | |
| 5,922,066 A | 7/1999 | Cho et al. | |
| 5,987,600 A | 11/1999 | Papworth et al. | |
| 6,078,969 A | 6/2000 | Ichimura et al. | |
| 6,079,008 A | 6/2000 | Clery, III | |
| 6,085,315 A | 7/2000 | Fleck et al. | |
| 6,173,366 B1 | 1/2001 | Thayer et al. | |
| 6,253,287 B1 | 6/2001 | Green | |
| 6,317,819 B1 | 11/2001 | Morton | |
| 6,332,186 B1 * | 12/2001 | Elwood et al. | 711/217 |
| 6,366,999 B1 | 4/2002 | Drabenstott et al. | |
| 6,539,467 B1 | 3/2003 | Anderson et al. | |
| 6,785,842 B2 | 8/2004 | Zumkehr et al. | |
| 6,839,828 B2 | 1/2005 | Gschwind et al. | |
| 6,889,307 B1 | 5/2005 | Scheuerlein | |
| 6,950,923 B2 | 9/2005 | O'Connor et al. | |
| 7,196,708 B2 * | 3/2007 | Dorojevets et al. | 345/502 |
| 7,243,262 B2 | 7/2007 | Mukherjee et al. | |
| 7,277,988 B2 | 10/2007 | Gower et al. | |
| 7,302,532 B2 | 11/2007 | Sandorfi | |
| 7,308,607 B2 | 12/2007 | Reinhardt et al. | |
| 7,467,288 B2 | 12/2008 | Glossner, III et al. | |
| 7,493,516 B2 | 2/2009 | Ferren et al. | |
| 7,584,336 B2 | 9/2009 | Tremaine | |
| 7,594,055 B2 | 9/2009 | Gower et al. | |
| 7,783,860 B2 | 8/2010 | Luick et al. | |
| 7,793,084 B1 | 9/2010 | Mimar | |
| 7,877,582 B2 | 1/2011 | Gschwind et al. | |
| 7,908,460 B2 | 3/2011 | Liao et al. | |
| 7,949,853 B2 | 5/2011 | Sandon et al. | |
| 8,108,652 B1 * | 1/2012 | Hui | 712/4 |
| 8,255,745 B2 | 8/2012 | Ferren et al. | |
| 8,489,919 B2 | 7/2013 | Clark et al. | |
| 8,688,962 B2 | 4/2014 | Raikin et al. | |
| 2004/0193840 A1 | 9/2004 | Kirsch | |
| 2005/0055543 A1 | 3/2005 | Moyer | |
| 2006/0143509 A1 | 6/2006 | Okawa | |
| 2007/0050661 A1 | 3/2007 | Ferren et al. | |
| 2008/0005479 A1 | 1/2008 | Tremaine | |
| 2008/0059758 A1 * | 3/2008 | Sachs | 712/4 |
| 2008/0222444 A1 | 9/2008 | Olofsson et al. | |
| 2009/0106526 A1 | 4/2009 | Luick et al. | |
| 2009/0172348 A1 | 7/2009 | Cavin | |
| 2009/0172364 A1 | 7/2009 | Sprangle et al. | |
| 2010/0036994 A1 | 2/2010 | Resnick | |
| 2010/0049951 A1 | 2/2010 | Gonion et al. | |
| 2010/0122069 A1 | 5/2010 | Gonion | |
| 2010/0268987 A1 | 10/2010 | Clark et al. | |
| 2010/0332764 A1 | 12/2010 | Jouppi | |
| 2011/0145543 A1 | 6/2011 | Damron | |
| 2011/0153983 A1 | 6/2011 | Hughes et al. | |
| 2011/0161642 A1 | 6/2011 | Eichenberger et al. | |
| 2011/0246828 A1 | 10/2011 | Monchiero et al. | |
| 2011/0264858 A1 | 10/2011 | Jeddeloh et al. | |
| 2012/0047398 A1 | 2/2012 | Vera et al. | |
| 2012/0060015 A1 * | 3/2012 | Eichenberger et al. | 712/4 |
| 2012/0124251 A1 | 5/2012 | Hnatko et al. | |
| 2012/0144089 A1 | 6/2012 | Hall et al. | |
| 2012/0233507 A1 | 9/2012 | Gonion | |
| 2012/0254591 A1 | 10/2012 | Hughes et al. | |
| 2014/0201498 A1 | 7/2014 | Ould-Ahmed-Vall et al. | |

OTHER PUBLICATIONS

A. Fawibe, et al., "New Memory Organizations for 3D DRAM and PCMs," Archictecture of Computing Systems, ARCS 2012—25th International Conference, Proceedings Publication Date: Feb. 29, 2012; pp. 1-12.

H. P. Hofstee, et al., "Power Efficient Processor Architecture and the Cell Processor," IEEE Computer Society 2005; Proceedings of the 11th Int'l Symposium on High-Performance Computer Architecture; pp. 1-5.

IBM, "Logic on DIMM," ip.com; ip.com No. IPCOM000191776D; Jan. 14, 2010; pp. 1-4.

Wikipedia, "Cell (microprocessor)," retrieved from http://en.wikipedia.org/wiki/Cell_%microprocessor%29 on Jul. 23, 2012; pp. 1-17.

David A Patterson, Lecture 6: Vector Processing, 1998, 60 pgs, retrieved from the internet on May 7, 2015, retrieved from URL <http://www.cs.berkeley.edu/~pattrsn/252S98/Lec06-vector.pdf>.

David Patterson and John Hennessy, Computer Architecture a Quantitative Approach, 1996, Morgan Kauffman, Second Edition, 4 pages.

Ergin et al, Register Packing: Exploiting Narrow-width operands for reducing register file pressure, IEEE, 1072-4451/04, 12 pqs, retrieved from the internet on May 7, 2015, retrieved from URL <http://ieeexplore.ieee.org./stamp/stamp.jsp?tp=&arnumbr=155100>.

\* cited by examiner

VECTOR REGISTER FILE

CROSS-REFERENCE TO RELATED APPLICATIONS

This is a continuation application that claims the benefit of U.S. patent application Ser. No. 13/570,372 filed Aug. 9, 2012, the contents of which are incorporated by reference herein in their entirety.

BACKGROUND

The present invention relates generally to computer memory, and more particularly to a vector register file.

Computer systems often require a considerable amount of high speed memory, such as random access memory (RAM), to hold information, such as data and programs, when a computer is powered and operational. Memory device demands have continued to grow as computer systems have increased performance and complexity.

Communication from a main processor to locations on memory devices can involve relatively long data access times and latency. The time it takes for the main processor to access memory can be, for example, several hundred cycles, including time to realize the data is not in cache (for memory reads), time to traverse from a processor core of the main processor to I/O, across a module or other packaging, arbitration time to establish a channel to memory in a multi-processor/shared memory system, and time to get the data into or out of a memory cell.

Computer systems can also include local memory within processors. Processors that include large register files typically require a large amount of internal memory. Register files with multiple ports and a large number of memory cells can drive processor sizing and performance in terms of area, power, and delays, which can further impact overall system sizing and performance.

SUMMARY

Exemplary embodiments include a system for accessing a vector register in a vector register file. The system includes the vector register file including a plurality of vector registers, where each vector register includes a plurality of elements. The vector register file is configured to perform a method including receiving a read command at a read port of the vector register file. The read command specifies a vector register address. The vector register address is decoded by an address decoder to determine a selected vector register of the vector register file. An element address is determined for one of the plurality of elements associated with the selected vector register based on a read element counter of the selected vector register. A word in a memory array of the selected vector register is selected as read data based on the element address. The read data is output from the selected vector register based on the decoding of the vector register address by the address decoder.

Additional exemplary embodiments include a system for accessing a vector register in a vector register file of a processing element in an active memory device. The system includes memory in the active memory device and a processing element coupled to the memory in the active memory device. The processing element includes a vector register file. The vector register file includes a plurality of vector registers, and each vector register includes a plurality of elements. The processing element is configured to perform a method including receiving a command from a requestor. The processing element fetches an instruction based on the command, the instruction being fetched from an instruction buffer in the processing element. The processing element decodes the instruction including a plurality of sub-instructions to execute in parallel, where at least one of the sub-instructions includes a read command targeting a vector register address of the vector register file. The read command is received at a read port of the vector register file, where the read command specifies the vector register address. The vector register address is decoded by an address decoder to determine a selected vector register of the vector register file. An element address is determined for one of the plurality of elements associated with the selected vector register based on a read element counter of the selected vector register. A word is selected in a memory array of the selected vector register as read data based on the element address. The read data is output from the selected vector register based on the decoding of the vector register address by the address decoder.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

An embodiment is directed to a vector register file in a vector processor of an active memory device. The active memory device may be any suitable memory device including a plurality of memory elements (e.g., chips) connected to a logic portion and a processing element. In an embodiment, the active memory device includes layers of memory that form a three dimensional ("3D") memory device (e.g., a memory cube) where individual columns of chips form vaults in communication with the processing element and logic. The active memory device may include a plurality of processing elements configured to communicate to the chips and other processing elements. In an embodiment, a processing element accesses a selected address in a vault through an interconnect network. In addition, the interconnect network provides a communication path between processing elements and vaults on the active memory device as well as between processing elements and a main processor. Each vault may have an associated memory controller or logic unit that is also coupled to the interconnect network.

Embodiments include an active memory device that can perform a complex set of operations using multiple locations (e.g., data stored at specific addresses) within the active memory device as operands. Further, a process is provided whereby the instructions and operations are performed autonomously on these operands within the active memory device. Specifically, the instructions are stored within the active memory device itself and are not executed by a main processor. The stored instructions are provided to the processing elements for processing by the processing element in the active memory device. In one embodiment, the processing elements are programmable engines, including an instruction buffer, an instruction unit with branching capability and instruction decode, a mixture of vector, scalar, and mask register files, a plurality of load/store units for the movement of data between memory and the register files, and a plurality of execution units for the arithmetic and logical processing of various data types. Also included in the active memory device are address translation capabilities for converting virtual addresses to physical addresses, a unified Load/Store Queue to sequence data movement between the memory and the processing elements, and a processor communications unit, for communication with the main processor.

In an embodiment, the active memory device is configured to load configuration information or instructions from a part of the active memory device into a processing element following receiving a command from an external requestor, such as a main processor or another processing element. In addition, the processing element may perform virtual-to-real address translations that are computed while executing the loaded instructions. In an example, when performing a load instruction, the active memory device accesses an operand from a memory location and places the operand in a register in the processing element. A virtual address of the memory location is generated by the load instruction and is translated into a real address by the processing element. Similarly, when performing a store instruction, the active memory device writes a memory location with the contents (e.g., an operand) in a register in the processing element. A virtual address of the memory location is generated by the store instruction and is translated into a real address by the processing element.

Embodiments of the processing element in the active memory device also have the ability to read or to write operands in any part of the active memory device through the interconnect network. Specifically, a processing element may access other vaults in the active memory device using the interconnect network. In an embodiment, processing elements are pooled and coupled to the vaults via the interconnect network, where the processing elements are not physically located in the vault stack. In an embodiment, the interconnect network is a coupling device, such as a crossbar switch, configured to connect any processing element to any memory vault, provided the processing element and memory vault are coupled to the interconnect. In an embodiment, the interconnect network may couple a plurality of active memory devices, where the interconnect network provides a communication path between processing elements and memory vaults of separate devices.

In one embodiment, the processing element is included with the memory controller as part of the stack. In addition, the processing element may perform complex arithmetic and logic operations on the operands, and read and write end results back to locations in memory. The active memory device may return a single result value or signal to the main processor indicating that the results of the desired complex operation are ready in the active memory device, thus performing the high bandwidth processing on the active memory device and using a lower bandwidth communication between the active memory device and main processor.

The processing capabilities within an active memory device may reduce memory latency and energy consumption that would otherwise be experienced when memory is accessed by a processor residing in a separate chip. Instead of bringing data from memory to the separate processing chip through lower bandwidth communication paths, performing what is often quite simple calculations on the data, and then transferring the processed data back to memory, the main processor can configure the processing elements within the active memory device, and then instruct them to carry out the data processing tasks. This may be achieved by sending one or more commands from the main processor to the active memory device. In this scenario, the movement of data between the location where the data processing is performed and memory is greatly reduced, both in the distance it has to travel from the memory to the data processing location, and in the number of levels of cache traversed through a memory hierarchy.

Figure 1:
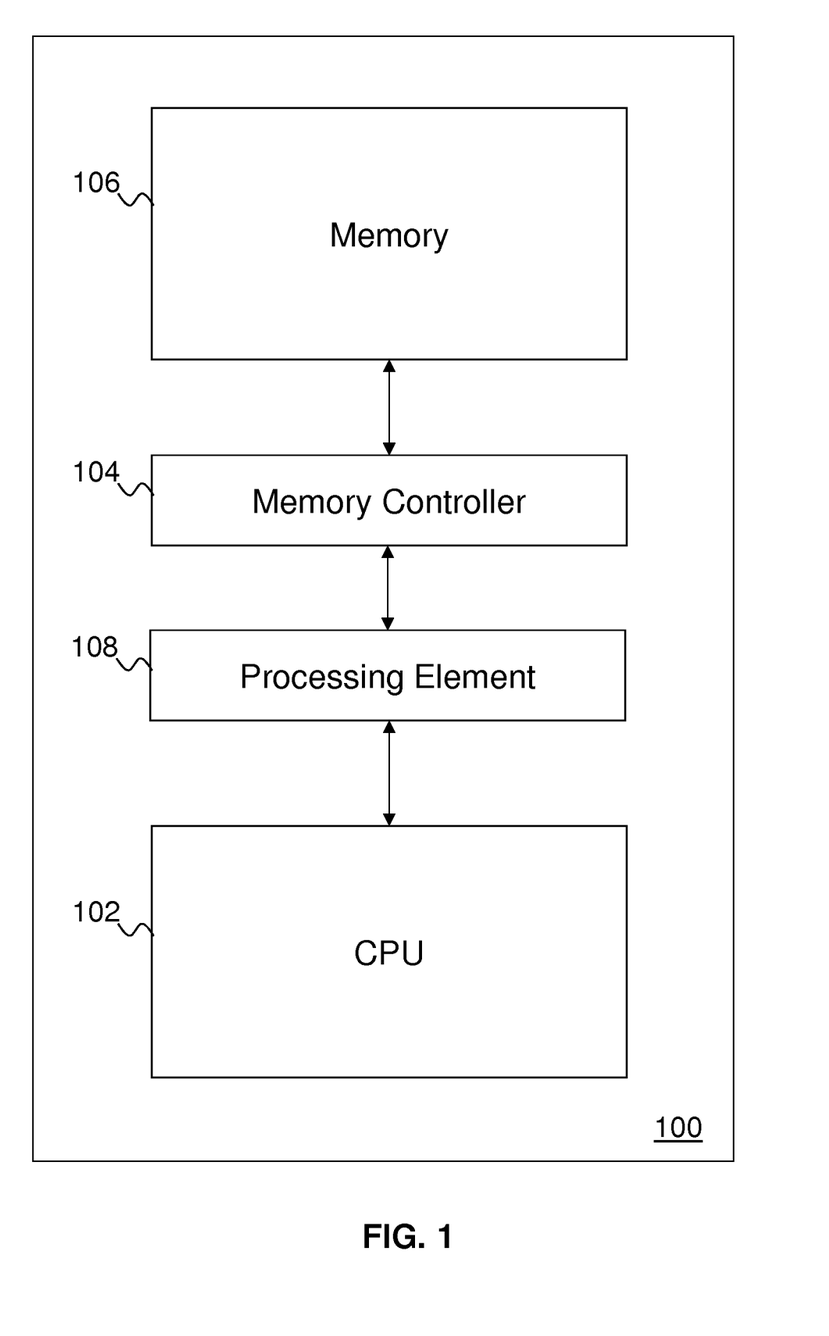
FIG. 1 illustrates a block diagram of a system for active memory in accordance with an embodiment.

FIG. 1 illustrates a block diagram of a system for storing and retrieving data in a memory in accordance with an embodiment. A system 100 depicted in FIG. 1 includes a computer processor (CPU) 102, a memory 106 having memory devices, as well as a memory controller 104 and processing element 108 for receiving and processing data from the computer processor 102 to be stored in the memory 106.

The memory controller 104 may be in communication with the computer processor 102 and receive write requests from the computer processor 102 without using functions of the processing element 108. The write requests contain data to be written to the memory 106 and a real address for identifying the location in the memory 106 to which the data will be written. The memory controller 104 stores data at a real address within the memory 106. The computer processor 102 can map the virtual address to a real address in the memory 106 when storing or retrieving data. The real address for a given virtual address may change each time data in the memory 106 is modified.

In an embodiment, the processing element 108 is in communication with the computer processor 102 and receives a command from the computer processor 102. The command may correspond to instructions stored in the memory 106 to perform write requests for data to be written to the memory 106. The command may also include a virtual address for identifying the location in the memory 106 to which the data will be written. The memory controller 104 and/or processing element 108 stores data at a real address within the memory 106. In an embodiment, the processing element 108 maps the virtual address to a real address in the memory 106 when storing or retrieving data. As described in further detail below, the computer processor 102 provides commands to the memory 106, where the processing element 108 receives the command and fetches corresponding instructions from the memory 106. The system 100 is one example of a configuration that may be utilized to perform the processing described herein. Although the system 100 has been depicted with only a single memory 106, memory controller 104, processing element 108 and computer processor 102, it will be understood that other embodiments would also operate in other systems with two or more of the memory 106, memory controller 104, processing element 108 or computer processor 102. In an embodiment, the memory 106, memory controller 104, processing element 108 and computer processor 102 are not located within the same computer. For example, the memory 106, processing element 108 and memory controller 104 may be located in one physical location (e.g., on a memory module) while the computer processor 102 is located in another physical location (e.g., the computer processor 102 accesses the memory controller 104 and/or processing element 108 via a network). In addition, portions of the processing described herein may span one or more of the memory 106, memory controller 104, processing element 108 and computer processor 102.

Figure 2:
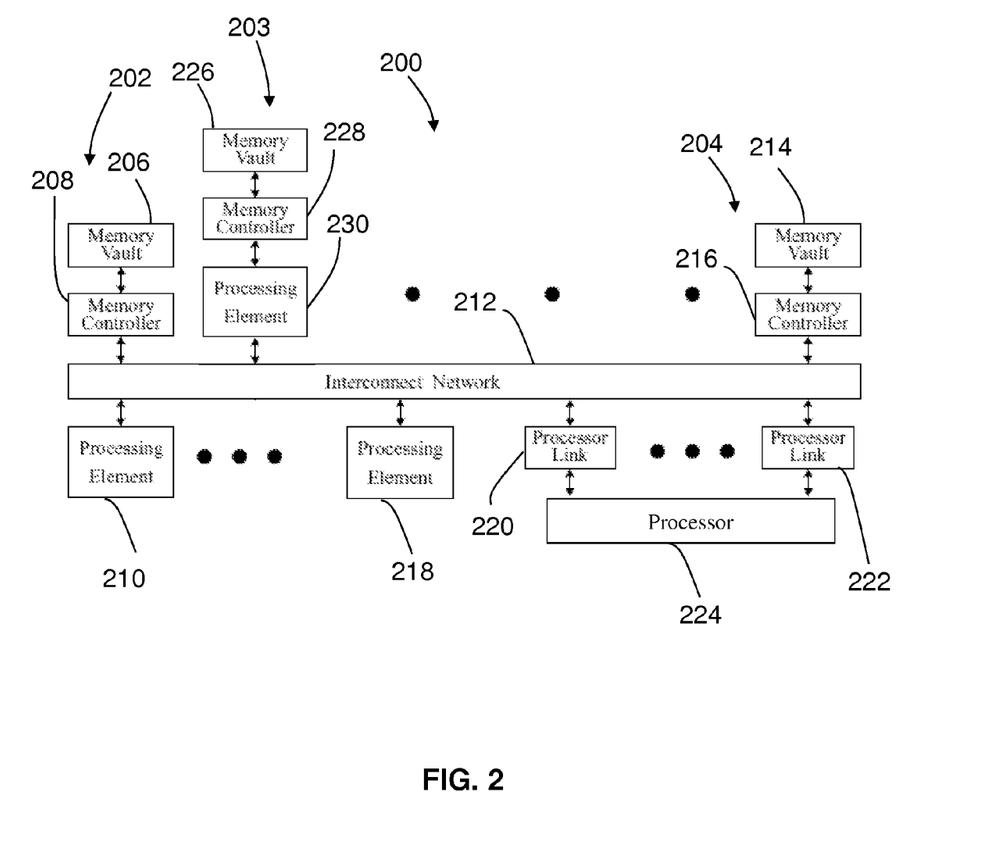
FIG. 2 illustrates a block diagram of a memory system with active memory in accordance with an embodiment.

FIG. 2 is a schematic diagram of an embodiment of a computer system 200 implementing active memory. In one embodiment, the computer system 200 includes an active memory device 202, an active memory device 203 and an active memory device 204. The active memory device 202 includes a memory vault 206, a memory controller 208 and a processing element 210. In an embodiment, the processing element 210, memory vault 206 and memory controller 208 are coupled and communicate via an interconnect network 212. Specifically, the processing element 210 communicates to the memory vault 206, memory controller 208 and other memory devices, such as active memory devices 203 and 204, via the interconnect network 212. The interconnect network 212 is also coupled to a main processor 224 by processor links 220 and 222. The interconnect network 212 provides a fast and high bandwidth path for communication between portions of the device, such processing elements, memory controllers and memory, to provide improved performance and reduced latency for the active memory.

The active memory device 203 includes a memory vault 226, a memory controller 228 and a processing element 230. In an embodiment, the processing element 230, memory vault 226 and memory controller 228 are all located on the same side of the interconnect network 212, such as within a single stack. By positioning the processing element 230 in the same stack as memory vault 226, the latency is reduced when accessing locations in the memory vault 226, thus further improving performance. In one embodiment, the active memory 204 includes a memory vault 214 and memory controller 216 coupled to processing element 210 and processing element 218 via the interconnect network 212. As depicted, the processing element 218 is located on the other side of the interconnect network 212 from the memory controller 216 and memory vault 214. In embodiments, the active memory devices 202, 203 and 204 include multiple layers of stacked addressable memory elements. Further, the stacks memory may be divided into memory vaults 206, 226 and 214, or three-dimensional blocked regions of the memory device which share a common memory controller and/or memory element, and are capable of servicing memory access requests to their domain of memory independently of one another.

In embodiments, the processing elements, memory vaults and memory controllers may be arranged in a suitable manner depending on the application. For example, one or more processing elements, such as processing element 218, may be positioned on one side of the interconnect network 212 and may operate as a pool of processing elements that are available for accessing any memory in the memory system coupled to the interconnect network 212. The pooled processing elements are not limited to accessing a particular memory vault and, thus, one or more elements may be utilized upon receiving a command from the main processor 224. Accordingly, processing element 218 may be configured to access each memory vault 206, 226 and 214. In another embodiment, one or more processing element, such as processing element 230, is located as part of a stack including a memory vault 226 and memory controller 228. In such a configuration, the processing element 230 is configured to access memory vault 226 coupled to the interconnect network 212, including memory vaults 206 and 214. In one embodiment, one or more processing element, such as processing element 210, is positioned on an opposite side of the interconnect network 212 from the memory vault 206 and memory controller 208. In the configuration, the processing element 210 is configured to access any memory coupled to the interconnect network 212, including memory vaults 226 and 214.

In an embodiment, the computer system may include a plurality of active memory devices, such as the active memory devices 202, 203 and 204. Further, each active memory device may include a plurality of stacks, each stack including a memory vault, memory controller and associated processing element. In one example, the number of processing elements may be greater than the number of memory vaults. In another embodiment, the memory devices may include fewer processing elements than memory vaults. In embodiments, the processing elements are pooled and available to access any memory in the system. For example, a memory device may include 16 memory vaults and memory controllers, but only eight processing elements. The eight processing elements are pooled, and utilized as resources for accessing any memory vaults coupled to the interconnect network. In another example, a memory device may be passive, where the device is controlled by processing elements of active memory devices coupled to the interconnect network.

Figure 3:
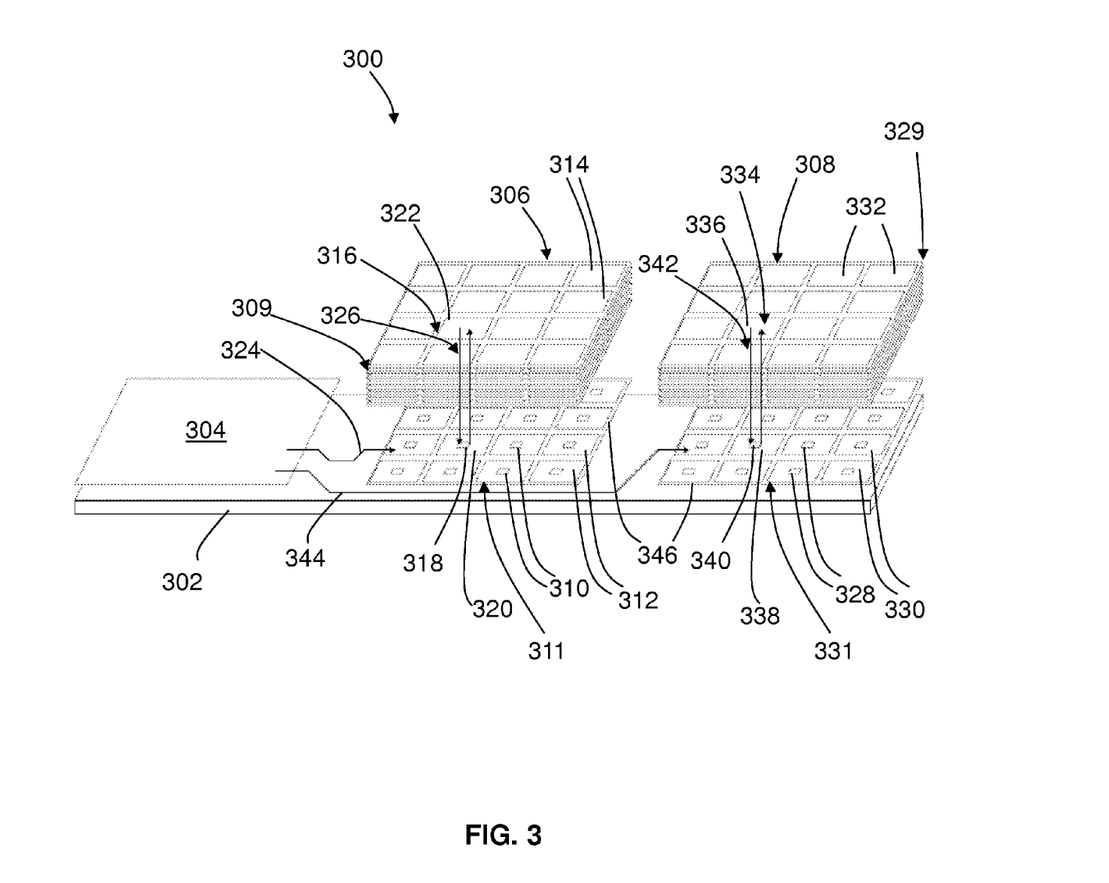
FIG. 3 illustrates a schematic diagram of a memory system with active memory in accordance with an embodiment.

FIG. 3 is a diagram of an exemplary computer system 300 implementing active memory. The computer system 300 includes a circuit board 302, a main processor 304, active memory device 306 and active memory device 308. The active memory device 306, active memory device 308 and main processor 304 are disposed on the circuit board 302. As depicted, portions of the active memory devices 306 and 308 are exploded to show details of the computer system 300 arrangement. The active memory devices 306 and 308 communicate to the main processor 304 via signal paths 324 and 344, respectively. As depicted, the active memory 306 device is arranged in layers, where a base layer 311 includes a plurality of memory controllers 310 and processing elements 312. For example, the active memory device 306 includes layers 309 of memory placed on top of the base layer 311, where the layers 309 each have a plurality of memory elements. As depicted, the base layer 311 also includes an interconnect network 346 to enable high bandwidth communication between memory, memory controllers and processing elements in the device.

In an embodiment, the active memory device 306 includes a plurality of memory vaults 314, where each memory vault 314 includes a memory element from each layer 309, the memory vaults 314 positioned adjacent to memory controllers 310 and processing elements 312. Specifically, the exemplary active memory device 306 includes layers of 16 memory elements, where the element layers form stacks, including a stack 316, where the stack 316 includes a memory vault 322 disposed above a memory controller 318 and a processing element 320. A high bandwidth communication path 326 provides a high bandwidth, direct and substantially reduced length (e.g., as compared to paths 324, 344) communication path between the processing element 320 and memory locations within the memory vault 322, thus reducing latency and power consumption for memory accesses. For example, the processing element 320 may receive a command from the main processor 304, load instructions from within the active memory device 306 based on the command, and, as part of the loaded instructions, access data at a location in the memory vault 314 and perform a complex operation on the data in the processing element 320. Further, the processing element 320 may also store data, such as the result, in the memory vault 314 and transmit a value or signal to the main processor 304 following execution of the command. In an embodiment, the processing element 320 stores or writes data (e.g. an operand) from a register in the processing element 320 to the memory vault 314. The processing element 320 is also configured to translate addresses from virtual-to-real and real-to-virtual as part of the read or store operations. Thus, the processing element 320 provides instruction loading, address translation, complex operations and other tasks local to the memory to reduce latency, save power and free up the main processor 304 to perform other tasks.

Similarly, the active memory device 308 includes a plurality of memory controllers 328 and processing elements 330 disposed on a base layer 331. In an embodiment, the active memory 308 includes layers 329 of memory devices placed on top of the base layer 331, where the layers 329 each have a plurality of memory devices. The base layer 331 also includes an interconnect network 346 to enable high bandwidth communication between memory and processing elements in the device. In an embodiment, the interconnect networks 346 of active memory device 306 and active memory device 308 are coupled and allow communication between processing elements and memory on separate devices.

In an embodiment, the active memory device 308 includes a plurality of memory vaults 332, where each memory vault 332 includes a memory element from each layer 329, the memory vaults 332 are positioned adjacent to memory controllers 328 and processing elements 330. The exemplary active memory device 308 includes 16 stacks, including stack 334, where the stack 334 includes a memory vault 336 disposed above a memory controller 340 and a processing element 338. A high bandwidth communication path 342 provides communication between the processing element 330 and memory locations within the memory vault 336.

Figure 4:
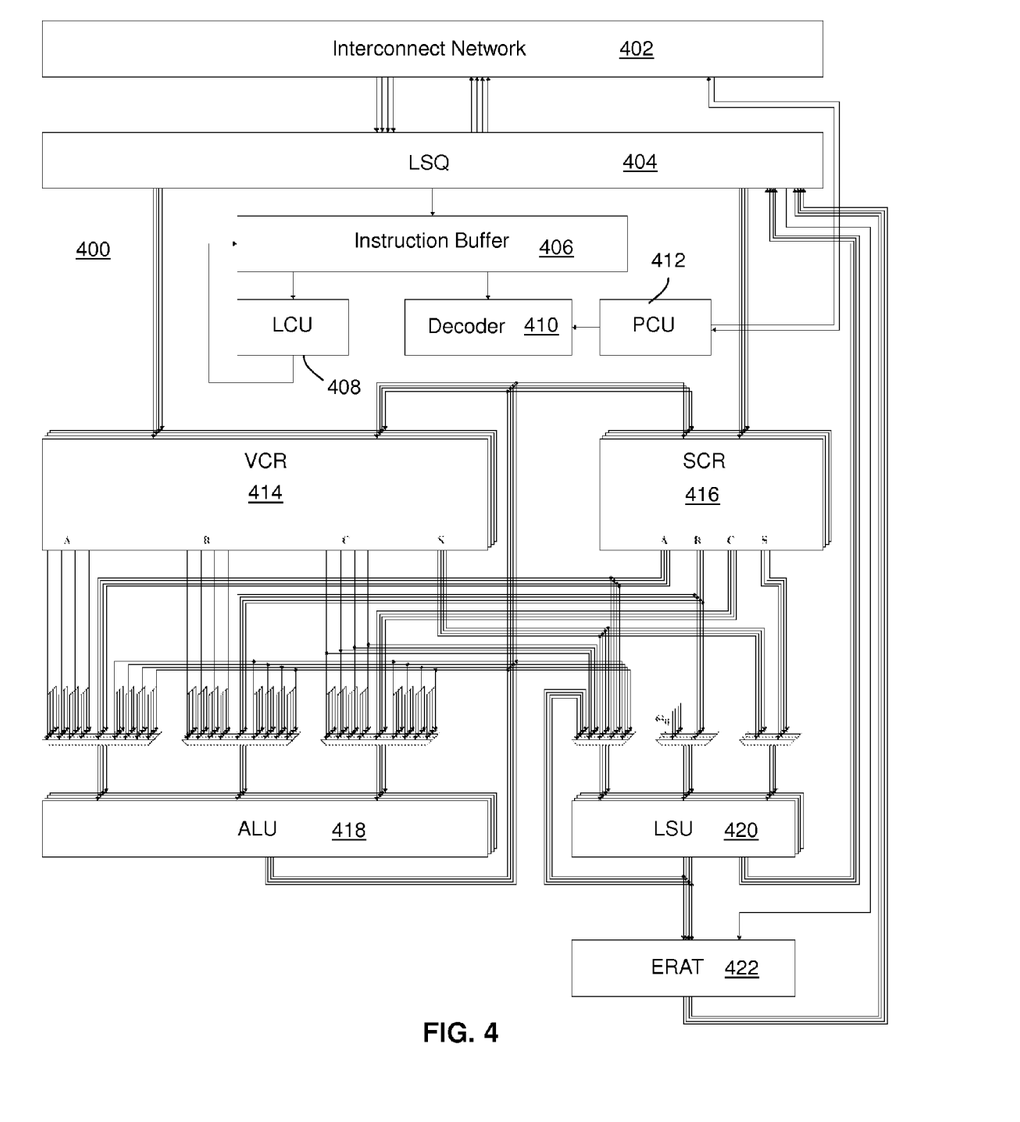
FIG. 4 illustrates a block diagram of a processing element for vector processing in an active memory device in accordance with an embodiment.

FIG. 4 depicts an example of a processing element 400 coupled to an interconnect network 402 as an embodiment of one of the processing elements of FIGS. 1-3. The processing element 400 is a programmable vector processing element, situated in an active memory device, such as one of the active memory devices of FIGS. 1-3. In the example of FIG. 4, the processing element 400 includes a load-store queue (LSQ) 404 coupled to the interconnect network 402 and to an instruction buffer 406. The instruction buffer 406 is also coupled to a lane control unit (LCU) 408 and a decoder 410. A processor communication unit (PCU) 412 provides a communication interface between the processing element 400 and the main processor or other processing elements through the interconnect network 402. The LSQ 404 is also coupled to a vector computation register file (VCR) 414 and a scalar computation register file (SCR) 416. The VCR 414 and SCR 416 are coupled through multiple multiplexers to an arithmetic logic unit (ALU) 418 and a memory-access unit 420, also referred to as a load-store unit (LSU) 420. The ALU 418 is coupled to itself and to the LSU 420 through multiplexers, and is also coupled to the VCR 414 and the SCR 416. The LSU 420 may also be coupled to itself, to the LSQ 404, to an effective-to-real address translation unit (ERAT) 422, to the VCR 414 and to the SCR 416 (all connections not depicted). The ERAT 422 is also coupled to the LSQ 404. As will be appreciated, numerous other connections and elements can be included in the processing element 400. For example, connections between the decoder 410 and other elements are not depicted for clarity. Additionally, depicted connections in FIG. 4 can be modified or omitted, such as the depicted connection between decoder 410 and PCU 412.

The processing element 400 supports an instruction set architecture including a broad range of arithmetic capabilities on many data types. Vector processing capabilities of the processing element 400 allows for single instruction, multiple data (SIMD) in time, while SIMD in a spatial dimension is also supported. The instruction buffer 406 holds instructions (also referred to as "lane instructions"), which are fetched and executed in order subject to branching.

In an embodiment, each lane instruction contains 9 sub-instructions for execution in various units within the processing element 400. An iteration count may be included within the lane instruction, allowing the sub-instructions to be repeated up to a predetermined number of times (e.g., up to 32 times). This facilitates SIMD in time. The LCU 408 can manage the iteration count and determine when to advance to a next instruction or repeat execution of the same instruction. In an embodiment, arithmetic pipelines of ALU 418 are 64 bits wide, and spatial SIMD is supported by virtue of the ability to execute data types smaller than 64 bits in parallel, simultaneously as multiple execution slots. For example, assuming that a lane instruction includes 9 sub-instructions, execution of the sub-instructions can be performed in the LCU 408 for lane control, and in four processing slices, each of which includes an ALU 418 and an LSU 420. Pairs of the VCR 414 and the SCR 416 can be implemented per processing slice and are accessible by each pair of the ALU 418 and LSU 420. Accordingly, the VCR 414, SCR 416, ALU 418, LSU 420, and associated multiplexers are depicted as stacks of four elements to indicate 4 processing slices in the example of FIG. 4.

At the processing slice level, computation can occur on floating-point and fixed-point data types at, for example, a 64-bit granularity in a temporal SIMD manner on 64-bit vector elements, and in a temporal and spatial SIMD manner on narrower vector sub-elements, which can be 32-bits, 16-bits, or 8-bits wide.

Each processing slice within the processing element 400 includes a memory access pipeline (load/store pipeline) and an arithmetic pipeline. Managing flow through the LSU 420 as a load/store pipeline can enable computation of one address per vector data element or sub-element. The processing element 400 provides the ability to perform associated fixed-point effective address (i.e., virtual address) computations. The arithmetic pipeline through the ALU 418 can include a robust assortment of floating-point and fixed-point operations to support a variety of workloads.

The LSU 420 may support load and store operations of, for example, 8, 4, 2 and 1 byte(s) and load and store operations of 4, 2, and 1 byte(s) to and from registers with packed data.

The ALU 418 may support copy operations between register files, arithmetic, rounding and conversion, comparison, and maximum and minimum operations on floating-point data types of double-precision (64 bits) and single-precision (32 bits), and arithmetic, rotate/shift, comparison, logical, count leading zeros, and ones population count operations on fixed-point data types of doubleword (64 bits), word (32 bits), halfword (16 bits) and bytes (8 bits).

In an embodiment, the computational model of a processing slice within the processing element 400 is a vector single instruction multiple data (SIMD) model with the VCR 414 and SCR 416. The VCR 414 can support multiple dimensions of registers, while the SCR 416 supports a single dimension of registers. For example, the VCR 414 can include 16 vector register entries with 32 elements each of 64 bits, and the SCR 416 can include 16 register entries with 1 element each of 64 bits, although numerous other configurations may be supported. A variable number of execution slots can be used, operating on an equal number of sub-elements, whereby the sub-elements taken together add up to one register element (either VCR 414 or SCR 416) of 64 bits in this example. The number of execution slots and the corresponding number of vector sub-elements depend upon the data type of the instruction. Examples of data types and sizes of various formats include: floating-point with double-precision (64-bit) and single-precision (32-bit) data types and fixed-point for a doubleword (64-bit), word (32-bit), halfword (16-bit), and byte (8-bit) data types.

Figure 5A:
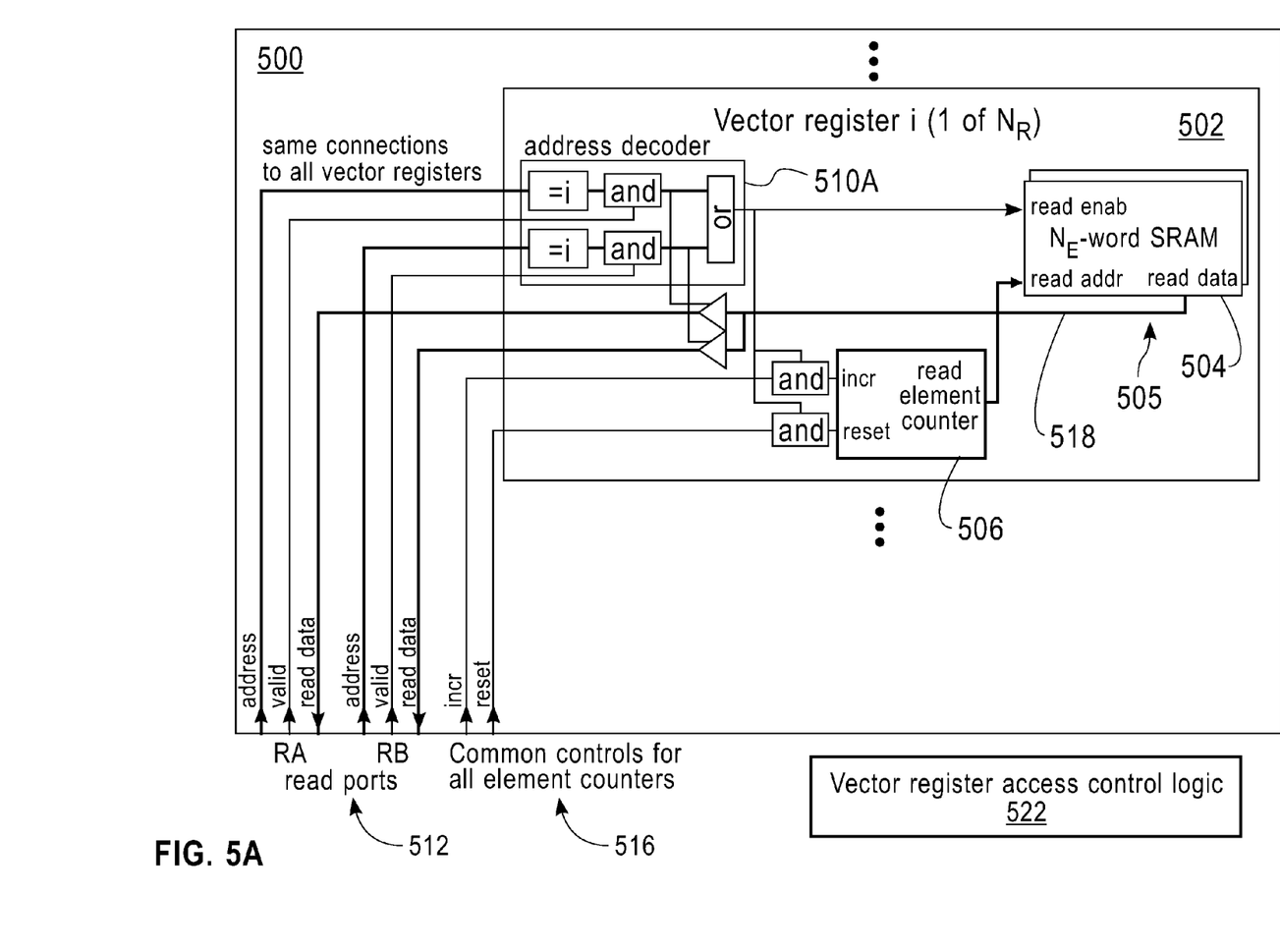
FIG. 5A illustrates a block diagram of a read interface to a vector register in a vector register file in accordance with an embodiment.
Figure 5B:
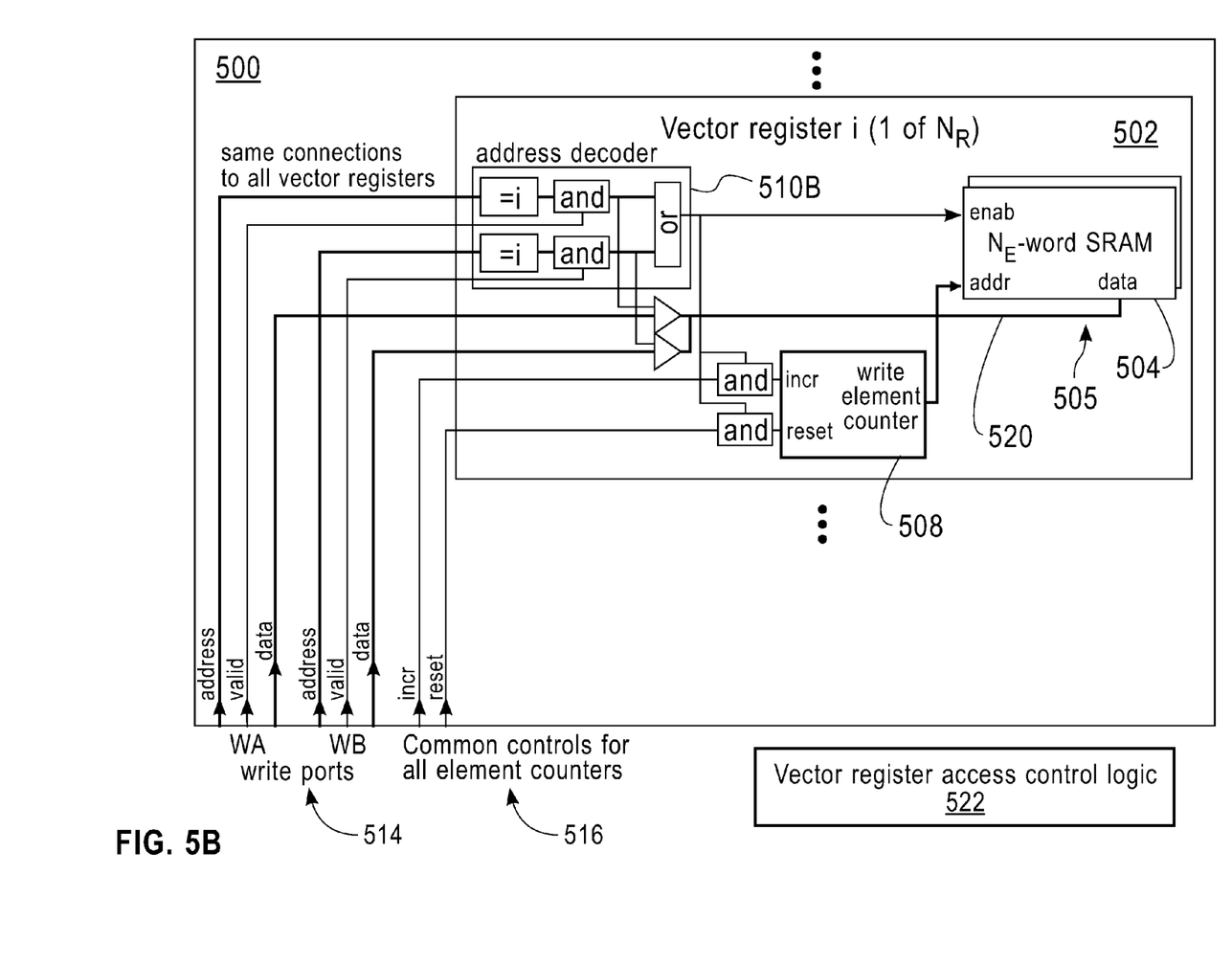
FIG. 5B illustrates a block diagram of a write interface to a vector register in a vector register file in accordance with an embodiment.

The VCR 414 is an example of a vector register file, which may also be referred to as a serialized vector register file. An embodiment of a vector register file 500 is depicted in FIGS. 5A and 5B. The vector register file 500 includes multiple vector registers 502, each of which includes a fast, dense memory array 504 of elements 505, a read element counter 506, a write element counter 508, address decoding logic 510A and 510B, read ports 512, write ports 514, and control inputs 516. Data in the vector register file 500 is organized, as shown in FIGS. 5A and 5B, into NR addressable vector registers (VRs) 502, each of which contains a vector of NE elements 505, each of which in turn is one W-bit word. The capacity of each vector register 502 may be comparable to that of a typical flat register file, and the capacity of the whole vector register file 500 is significantly larger than a typical flat register file. The memory array 504 may be a static random access memory (SRAM) or other fast and dense memory technology. In an exemplary embodiment, the vector register file 500 as a whole has multiple read and write ports 512 and 514, but only one element 505 within a vector register 502 can be read or written at a time, as controlled by vector register access control logic 522 using the element counters 506 and 508.

In an exemplary embodiment, the read ports 512 include ports RA and RB, each of which can include address lines, read data lines, and a valid signal. The write ports 514 can includes ports WA and WB with address lines, write data lines, and valid signals. The control inputs 516 may include an increment control signal and a reset control signal that are routed to the read element counter 506 and write element counter 508 of each vector register 502. Decoding performed by the address decoding logic 510A and 510B can determine whether a particular element counter 506 or 508 should respond to the control inputs 516. For example, the element counters 506 and 508 may be adjusted when a matching address for the vector register 502 is decoded and a valid input is received on at least one of the ports 512, 514. Alternatively, each of the read and write ports RA, RB, WA, and WB of the vector register file 500 may have an associated increment control signal and an associated reset control signal to control incrementing and resetting of the read element counter 506 and the write element counter 508 on a port basis.

The vector register file 500 supports a vector instruction set architecture in which the element counters 506 and 508 of each vector register 502 accessed by an instruction can be reset before the execution of that instruction so elements 505 are read/written from the beginning of each vector. One vector register 502 may include a conventional NE×W bit SRAM in the memory array 504 and read and write element counters 506 and 508 with NE different values. The read and write element counters 506 and 508 provide read and write element addresses of the memory array 504. The control inputs 516 for each element counter 506 and 508 can increment or reset the counter values as commanded by the vector register access control logic 522. The vector register file 500 also contains address decoding logic 510A and 510B to decode the vector register address on each of its ports 512 and 514. The address decoding logic 510A and 510B can be combined as a single decoding logic block per vector register 502 or otherwise distributed. For vector instructions that reset the element counters 506 or 508, for each vector register 502 accessed, the associated element counters 506 and/or 508 can be reset before the first access cycle. The address decoding logic 510A and 510B may supply a read/write enable and data inputs (for writes) to the memory array 504 for each iteration of the instruction and enable incrementing of the appropriate element counter 506 or 508 of the accessed vector register 502 after each instruction iteration.

A vector instruction executed by the processing element 400 can operate on vector data by addressing a vector register 502 in the vector register file 500 to access multiple elements 505 in the vector register 502 serially (e.g., sequentially), in multiple cycles. The element addresses for each cycle do not need to be specified by the vector instruction, although the vector instruction may have implicit control of the element counters 506 and 508. The instruction set architecture for accessing the vector register file 500 may support vector instructions that can reset the element counters 506 and 508 at the start of each vector instruction, select whether to reset or continue incrementing the element counters 506 and 508 from their current value, and select whether to start from a specific value or continue incrementing the element counters 506 and 508 from their current value. Instructions in the vector instruction set architecture which perform read/write operations on the vector register file 500 specify a selected vector register 502. Similarly, the address on one port 512, 514 of the vector register file 500 specifies a vector register 502, but does not explicitly specify an individual word (one element 505 of that vector register 502). One element 505 of the vector in the vector register 502 can be read and/or written at a time, under control of the appropriate element counter 506 and 508. The element counters 506 and 508 are part of the architected state of the processing element 400, and can be accessed by privileged instructions to support debugging of the processing element 400. There may be a dedicated data path through a separate port or ports (not depicted) to support reading and writing values of the element counters 506 and 508. Alternatively, ports 512 and 514 may support reading and writing values of the element counters 506 and 508 using privileged instructions.

A vector instruction may include an iteration count n, which can be static or come from a dynamic state of the processing element 400, and can be less than the maximum vector length NE. When a vector instruction has a vector operand or target, the instruction specifies the vector register 502 for that operand/target. An associated element counter 506, 508 increments after each iteration of the instruction, referencing n elements 505 of the vector register 502. The vector register file 500 can support instructions which include more than one vector operand, as well as microarchitectures in which multiple pipelines (e.g., arithmetic and load/store) access the vector register file 500 at the same time.

In an exemplary embodiment, the number of ports on the memory array 504 (i.e., ports 518 and 520) in one vector register 502 is equal to the number of element counters 506 and 508 associated with that vector register 502. The vector register file 500 as a whole may include more ports than ports of the memory array 504 of the vector register 502. In the example of FIGS. 5A and 5B, two read ports 512 (RA and RB) and two write ports 514 (WA and WB) of the vector register file 500 are depicted; however, greater numbers of read and/or write ports can be supported by the vector register file 500. For example, the vector register file 500 may have 4 read and 2 write ports, while each vector register 502 may have 1 read-element counter 506 and 1 write-element counter 508. In this example, up to 6 vector registers 502 may be accessed simultaneously, but if multiple read ports access a given vector register 502, they will read the same elements 505. The vector register 502 with 2 element counters 506 and 508 can be implemented with a 2-port memory array 504, where port 518 provides read data access and port 520 provides write data access. The compact physical design of a 2-port memory array 504 enables the area of a 6-port vector register file to be much smaller than a conventional flat 6-port register file with the same word width W and the same total number of words.

Because the vector register file 500 can supply multiple-word vector data without changing the address specifying the vector register 502, it enables a low-power processing element 400 in which the sequencing and decoding of one instruction results in computation on multiple-element vector data. It may also save instruction bits, as instruction operand fields do not need to specify an element.

Because there are element counters 506 and 508 for each vector register 502, and they can retain their state between instructions, the vector register file 500 enables operations on vectors to be divided between multiple instructions. For example, one instruction may access the first 6 elements 505 of a vector register 502, and a later instruction may access some or all of the remaining elements 505 of the same vector register 502. Further, which elements 505 of a vector register 502 are accessed may depend dynamically on data computed during program execution. For example, an intervening conditionally-executed instruction can access the same vector register 502 and thereby increment or reset one of the element counters 506 and 508.

The vector register file 500 supports a vector instruction set architecture syntax which can include a reset/continue bit to control the reset of the element counters 506 and 508 of each vector register 502 accessed by that instruction. Either all of the element counters 506 and 508 can be reset such that elements 505 are read/written from the beginning of each vector, or the element counters 506 and 508 can continue from their current values. In this way, one instruction may read i elements 505 from the beginning of a vector register 502 and the next instruction may add the next j elements 505 of that vector register 502 to the first j elements 505 of another vector register 502. The element counters 506 and 508 may be reset before the first iteration of each instruction that is conditional and depends on a reset/continue input to the vector register file 500.

The vector register file 500 can also support a vector instruction set architecture syntax which includes a separate reset/continue bit for each operand. The vector register file 500 may have a separate reset/continue input for each port, RA, RB, WA, and WB. Decode logic may drive the control inputs 516 of the vector register 502 addressed by the ports 512, 514. Control inputs 516 can be driven by the decoder 410 of FIG. 4 or by the vector register access control logic 522 which may be within the vector register file 500.

The vector register file 500 can support a vector instruction set architecture syntax which includes a starting element count, so each accessed vector is read/written starting at that element. A vector instruction set architecture syntax which includes a starting element count for each operand may also be supported using the vector register file 500. The vector register file 500 can also support a vector instruction set architecture syntax which enables or disables the counter incrementing in each accessed vector. In this way, for example, all elements of one vector register 502 may be multiplied by the same element of another vector register 502, with the result written to a third vector register 502.

In an exemplary embodiment, the vector register 502 supports prefetching of elements 505 based on the read element counter 506. Since elements 505 are accessed sequentially within each vector register 502, the next element 505 to be read is not arbitrary; it is either the next element 505 or the first element 505. The next element 505 may be read at a time dependent on internal timing requirements of the vector register 502. The value of either the next element 505 or the first element 505 can be pre-fetched from the memory array 504 and ready for output as read data when the vector register 502 is read by a next read command targeting the selected vector register 502. Prefetching may be controlled using a combination of the address decoding logic 510A and the read element counter 506. The particular value to output as the read data can be determined based on whether the read element counter 506 is instructed to reset or continue as part of the read instruction. Because the read timing to access the memory array 504 is not dependent on decoding address inputs, internal vector register prefetching allows the read process to start early without driving timing assertions for addresses, having more time to complete, allowing read data to be available at the vector register file 500 output earlier, and allowing lower-power circuits inside the memory array 504.

Figure 6:
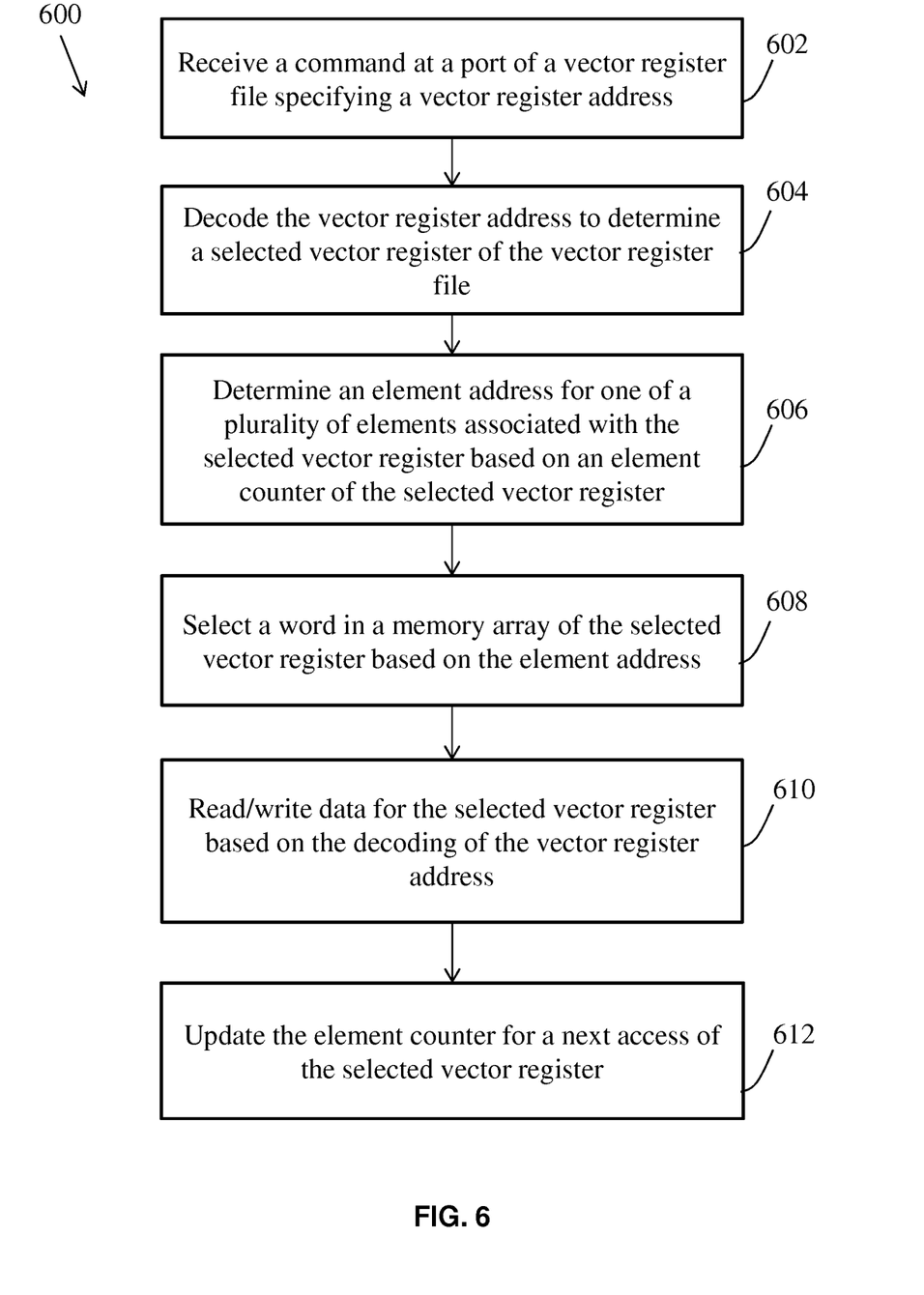
FIG. 6 illustrates a flow diagram of a process for accessing a vector register in a vector register file in accordance with an embodiment.

FIG. 6 is a process 600 for accessing a vector register file in a vector processing element of an active memory device. The active memory device may be a three-dimensional memory cube with memory divided into three-dimensional blocked regions as memory vaults, such as the active memory devices of FIGS. 1-4. The blocks depicted in FIG. 6 may be performed upon a vector register file 500 of FIGS. 5A and 5B in one of the processing elements of FIGS. 1-4 in an active memory device. For purposes of explanation, the processing element is described in reference to processing element 400 of FIG. 4. It will also be understood that the vector register file 500 of FIGS. 5A and 5B can be implemented in other types of processing circuits and systems.

The processing element 400 in an active memory device may wait for a command. The command can be sent by a requestor to the active memory device to perform one or more actions, where the requestor may be a main processor, a network interface, an I/O device or an additional active memory device in communication with the processing element 400. The processing element 400 may fetch an instruction, e.g., a lane instruction, from the instruction buffer 406 based on the command. The decoder 410 partitions the instruction into sub-instructions and passes the sub-instructions to corresponding functional units for further decoding and processing. One of the sub-instructions may include a read or write command targeting a vector register address of the vector register file 500, such as an address for accessing VCR 414.

At block 602, a read or write command is received at a port of a vector register file 500 specifying a vector register address. For example, a read command can be received at read port RA or RB of read ports 512. Alternatively, a write command can be received at write port WA or WB of write ports 514.

At block 604, address decoding logic 510A, 510B decodes the vector register address to determine a selected vector register 502 of the vector register file 500. The address decoding logic 510A, 510B may receive address and valid signals from the decoder 410 of FIG. 4 or the vector register access control logic 522, where decoding can be performed in combination with the valid signals associated with each of the ports 512, 514.

At block 606, an element address is determined for one of a plurality of elements 505 associated with the selected vector register 502 based on an element counter 506, 508 of the selected vector register 502. For a read command, the value of the read element counter 506 is used as a read address to read a word or element 505 from the memory array 504. For a write command, the value of the write element counter 508 is used as a write address to write a word or element 505 to the memory array 504. At block 608, a word or element 505 in a memory array 504 of the selected vector register 502 is selected based on the element address.

At block 610, data is read or written for the selected vector register 502 based on the decoding of the vector register address. For example, read data can be output from the selected vector register 502 based on the decoding of the vector register address by the address decoding logic 510A. Write data may be written to the element 505 of the selected vector register 502 based on decoding of the vector register address by the address decoding logic 510B and the element address.

At block 612, the element counter 506, 508 for a next access of the selected vector register 502 is updated. Element counter 506, 508 updates may be performed prior to or after data is read or written. Incrementing the read element counter 506 selects a next sequential element 505 in the memory array 504 as the read data for either the current read command or the next read command targeting the selected vector register 502. The incrementing may be performed based on receiving an increment control signal at the selected vector register 502 and based on the decoding of the vector register address by the address decoding logic 510A. The incrementing can be performed after each iteration of a vector instruction to sequentially access the plurality of elements 505 of the selected vector register 502. Based on incrementing the read element counter 506 to select the next sequential element 505, prefetching of read data for the next read command targeting the selected vector register 502 may be performed prior to receiving the next read command targeting the selected vector register 502. The prefetched read data can be output based on receiving the next read command targeting the selected vector register 502. Resetting of the read element counter 506 to select a first element in the memory array 504 as the read data for either the current read command or the next read command targeting the selected vector register 502 may also be performed. The resetting can be based on receiving a reset control signal at the selected vector register 502 and based on the decoding of the vector register address by the address decoding logic 510A. Similar incrementing and resetting can be performed for the write element counter 508 as well.

The element counters 506 and 508 can also support being read and preset to particular values. For example, a value of one or more of the read element counter 506 and the write element counter 508 can be read based on receiving an element counter read command. Additionally, the value of one or more of the read element counter 506 and the write element counter 508 can be written or preset based on receiving an element counter write command.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system for accessing a vector register in a vector register file, the system comprising:
  the vector register file comprising a plurality of vector registers and each vector register comprising a plurality of elements; and
  the vector register file configured to perform a method comprising:
    receiving a read command at a read port of the vector register file, the read command specifying a vector register address, wherein a second read port of the vector register file is addressable to read a same element of the vector register address in parallel with the read port and the second read port is addressable to read a different vector register address in parallel with the read port;

decoding the vector register address by an address decoder to determine a selected vector register of the vector register file absent an element address to perform serialized access of the vector register file;

determining the element address for one of the plurality of elements associated with the selected vector register based on a read element counter of the selected vector register, wherein each vector register comprises a separate instance of the read element counter to independently retain state between instructions at each vector register;

selecting a word in a memory array of the selected vector register as read data based on the element address;

outputting the read data from the selected vector register based on the decoding of the vector register address by the address decoder;

incrementing the read element counter of the selected vector register to select a next sequential element in the memory array as the read data for one of: the read command and a next read command targeting the selected vector register;

performing the incrementing based on receiving an increment control signal at the selected vector register and based on the decoding of the vector register address by the address decoder;

based on incrementing the read element counter to select the next sequential element, prefetching the read data from the selected vector register for the next read command targeting the selected vector register prior to receiving the next read command targeting the selected vector register; and outputting the prefetched read data based on receiving the next read command targeting the selected vector register.

2. The system of claim 1, wherein the incrementing is performed after each iteration of a vector instruction to sequentially access the plurality of elements of the selected vector register.

3. The system of claim 1, wherein the vector register file is further configured to perform:

resetting the read element counter to select a first element in the memory array as the read data for one of: the read command and a next read command targeting the selected vector register; and performing the resetting based on receiving a reset control signal at the selected vector register and based on the decoding of the vector register address by the address decoder.

4. The system of claim 1, wherein the read port of the vector register file is one of a plurality of read ports coupled to the selected vector register, and the vector register file is further configured to perform:

receiving valid signals associated with each of the read ports at the selected vector register; and performing the decoding of the vector register address by the address decoder in combination with the valid signals associated with each of the read ports.

5. The system of claim 1, wherein the vector register file is further configured to perform:

receiving a write command at a write port of the vector register file, the write command specifying the vector register address and write data;

decoding the vector register address by the address decoder to determine the selected vector register of the vector register file;

determining the element address for one of the plurality of elements associated with the selected vector register based on a write element counter of the selected vector register, wherein each vector register comprises a separate instance of the write element counter to independently retain state between instructions;

selecting an element in the memory array of the selected vector register to write based on the element address; and writing the write data to the element of the selected vector register based on the decoding of the vector register address by the address decoder and the element address.

6. The system of claim 5, wherein the vector register file is further configured to perform:

reading a value of one or more of the read element counter and the write element counter based on receiving an element counter read command; and writing the value of one or more of the read element counter and the write element counter based on receiving an element counter write command.

7. The system of claim 5, wherein a total number of read and write ports of the vector register file is greater than a total number of read and write ports of the memory array.

8. The system of claim 7, wherein each of the read and write ports of the vector register file has an associated increment control signal and an associated reset control signal to control incrementing and resetting of the read element counter and the write element counter on a port basis.

9. A system for accessing a vector register in a vector register file of a processing element in an active memory device, the system comprising:

memory in the active memory device; and a processing element coupled to the memory in the active memory device, the processing element comprising a vector register file, wherein the vector register file comprises a plurality of vector registers and each vector register comprises a plurality of elements, and the processing element is configured to perform a method comprising:

receiving, in the processing element, a command from a requestor;

fetching, in the processing element, an instruction based on the command, the instruction being fetched from an instruction buffer in the processing element;

decoding, in the processing element, the instruction comprising a plurality of sub-instructions to execute in parallel, wherein at least one of the sub-instructions includes a read command targeting a vector register address of the vector register file;

receiving the read command at a read port of the vector register file, the read command specifying the vector register address, wherein a second read port of the vector register file is addressable to read a same element of the vector register address in parallel with the read port and the second read port is addressable to read a different vector register address in parallel with the read port;

decoding the vector register address by an address decoder to determine a selected vector register of the vector register file absent an element address to perform serialized access of the vector register file;

determining the element address for one of the plurality of elements associated with the selected vector register based on a read element counter of the selected vector register, wherein each vector register comprises a separate instance of the read element counter to independently retain state between instructions at each vector register;

selecting a word in a memory array of the selected vector register as read data based on the element address;

outputting the read data from the selected vector register based on the decoding of the vector register address by the address decoder;

incrementing the read element counter of the selected vector register to select a next sequential element in the memory array as the read data for one of: the read command and a next read command targeting the selected vector register;

performing the incrementing based on receiving an increment control signal at the selected vector register and based on the decoding of the vector register address by the address decoder;

based on incrementing the read element counter to select the next sequential element, prefetching the read data from the selected vector register for the next read command targeting the selected vector register prior to receiving the next read command targeting the selected vector register; and outputting the prefetched read data based on receiving the next read command targeting the selected vector register.

10. The system of claim 9, wherein the active memory device is a three-dimensional memory cube with memory divided into three-dimensional blocked regions as memory vaults.

11. The system of claim 9, wherein the incrementing is performed after each iteration of a vector instruction to sequentially access the plurality of elements of the selected vector register.

12. The system of claim 9, wherein the processing element is further configured to perform:

resetting the read element counter to select a first element in the memory array as the read data for one of: the read command and a next read command targeting the selected vector register; and performing the resetting based on receiving a reset control signal at the selected vector register and based on the decoding of the vector register address by the address decoder.

13. The system of claim 9, wherein the read port of the vector register file is one of a plurality of read ports coupled to the selected vector register, and the processing element is further configured to perform:

receiving valid signals associated with each of the read ports at the selected vector register; and performing the decoding of the vector register address by the address decoder in combination with the valid signals associated with each of the read ports.

14. The system of claim 9, wherein the processing element is further configured to perform:

receiving a write command at a write port of the vector register file, the write command specifying the vector register address and write data;

decoding the vector register address by the address decoder to determine the selected vector register of the vector register file;

determining the element address for one of the plurality of elements associated with the selected vector register based on a write element counter of the selected vector register, wherein each vector register comprises a separate instance of the write element counter to independently retain state between instructions;

selecting an element in the memory array of the selected vector register to write based on the element address; and writing the write data to the element of the selected vector register based on the decoding of the vector register address by the address decoder and the element address.

15. The system of claim 14, wherein the processing element is further configured to perform:

reading a value of one or more of the read element counter and the write element counter based on receiving an element counter read command; and writing the value of one or more of the read element counter and the write element counter based on receiving an element counter write command.

16. The system of claim 14, wherein a total number of read and write ports of the vector register file is greater than a total number of read and write ports of the memory array.

17. The system of claim 16, wherein each of the read and write ports of the vector register file has an associated increment control signal and an associated reset control signal to control incrementing and resetting of the read element counter and the write element counter on a port basis.

* * * * *